United States Patent [19]

Wiley

[11] Patent Number: 5,769,772

[45] Date of Patent: Jun. 23, 1998

[54] PACKAGES MADE WITH BOTH HIGH-FREQUENCY/RADIO-FREQUENCY SEALS AND CONVENTIONAL HEAT/PRESSURE SEALS USING COMBINATIONS OF POLAR AND NON-POLAR POLYMERS

[75] Inventor: Jay M. Wiley, Victor, N.Y.

[73] Assignee: Tenneco Packaging Inc., Evanston, Ill.

[21] Appl. No.: 696,238

[22] Filed: Aug. 13, 1996

[51] Int. Cl.[6] ....................................................... B31B 1/90

[52] U.S. Cl. .......................... 493/189; 493/213; 493/214; 493/215

[58] Field of Search ..................................... 493/212, 213, 493/214, 215, 381, 393, 394, 927, 192, 193, 194, 195, 196, 197

[56] References Cited

U.S. PATENT DOCUMENTS

| | | |
|---|---|---|
| Re. 33,674 | 8/1991 | Uramoto . |
| Re. 34,554 | 3/1994 | Ausnit . |
| 3,780,781 | 12/1973 | Uramoto . |
| 4,651,504 | 3/1987 | Bentsen ................................... 493/214 |
| 4,923,309 | 5/1990 | Van Erden . |
| 4,971,454 | 11/1990 | Branson ................................... 493/214 |
| 5,007,142 | 4/1991 | Herrington . |
| 5,007,143 | 4/1991 | Herrington . |
| 5,010,627 | 4/1991 | Herrington et al. . |
| 5,020,194 | 6/1991 | Herrington et al. . |
| 5,023,122 | 6/1991 | Boeckmann et al. . |
| 5,063,644 | 11/1991 | Herrington et al. . |
| 5,067,208 | 11/1991 | Herrington, Jr. et al. . |
| 5,070,583 | 12/1991 | Herrington . |
| 5,088,971 | 2/1992 | Herrington . |
| 5,092,684 | 3/1992 | Weeks . |
| 5,092,831 | 3/1992 | James et al. . |
| 5,116,301 | 5/1992 | Robinson et al. . |
| 5,121,997 | 6/1992 | LaPierre et al. . |
| 5,129,734 | 7/1992 | Van Erden . |
| 5,131,121 | 7/1992 | Herrington, Jr. et al. . |
| 5,161,286 | 11/1992 | Herrington, Jr. et al. . |
| 5,186,543 | 2/1993 | Cochran . |
| 5,189,764 | 3/1993 | Herrington et al. . |
| 5,211,482 | 5/1993 | Tilman ..................................... 493/214 |
| 5,224,779 | 7/1993 | Thompson et al. . |
| 5,283,932 | 2/1994 | Richardson et al. . |
| 5,301,394 | 4/1994 | Richardson et al. . |
| 5,301,395 | 4/1994 | Richardson et al. . |
| 5,334,127 | 8/1994 | Bruno ..................................... 493/214 |
| 5,405,478 | 4/1995 | Richardson et al. . |
| 5,426,830 | 6/1995 | Richardson et al. . |
| 5,431,760 | 7/1995 | Donovan . |
| 5,435,864 | 7/1995 | Machacek ............................... 493/214 |
| 5,442,837 | 8/1995 | Morgan . |
| 5,442,838 | 8/1995 | Richardson et al. . |
| 5,448,807 | 9/1995 | Herrington, Jr. . |
| 5,456,928 | 10/1995 | Hustad et al. . |
| 5,482,375 | 1/1996 | Richardson et al. . |
| 5,489,252 | 2/1996 | May ........................................ 493/214 |
| 5,492,411 | 2/1996 | May ........................................ 493/214 |

OTHER PUBLICATIONS

Technology News, "Metallocene Compounds Debut at Medical Show," Plastics World, Mar. 1996.

*Primary Examiner*—Jack W. Lavinder
*Attorney, Agent, or Firm*—Arnold, White & Durkee

[57] ABSTRACT

A package having multiple seals in close proximity is set forth. At least one of the seals is accomplished through the use of a polar polymer that bonds to an opposing panel in the package when exposed to an alternative electromagnetic field. The strength of the sealing can be controlled by the type and the amount of the polar polymer that is present as well as the field strength of the electromagnetic radiation, and its duration. The region to be sealed by the electromagnetic radiation can also be precisely controlled.

31 Claims, 4 Drawing Sheets

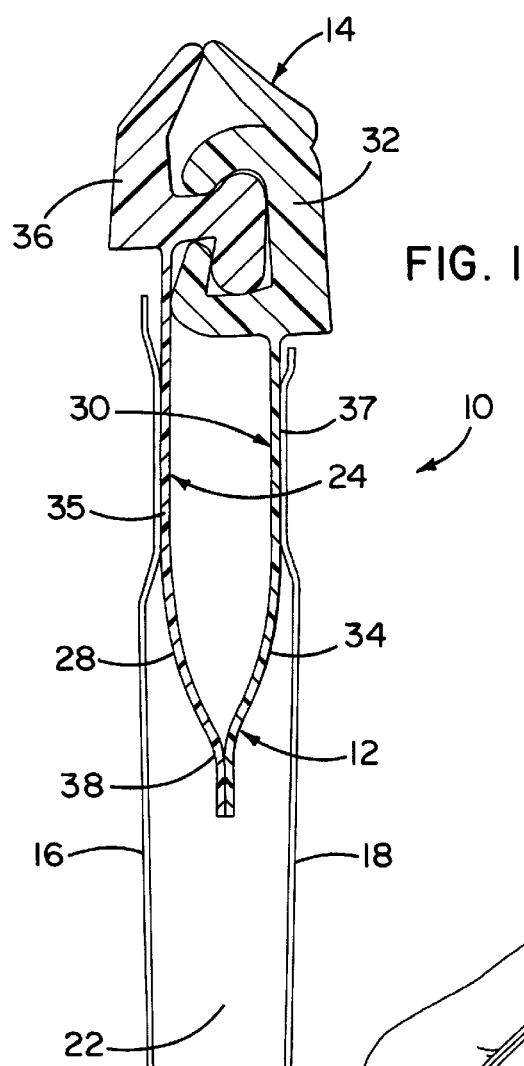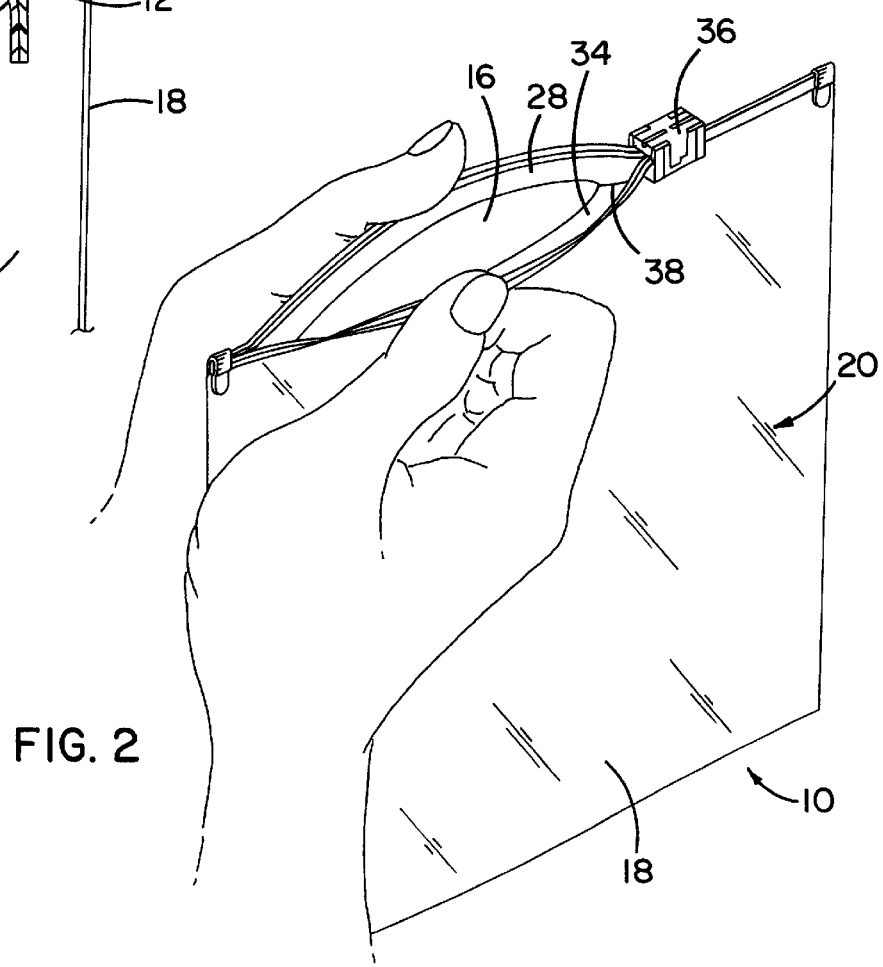

5,769,772

PACKAGES MADE WITH BOTH HIGH-FREQUENCY/RADIO-FREQUENCY SEALS AND CONVENTIONAL HEAT/PRESSURE SEALS USING COMBINATIONS OF POLAR AND NON-POLAR POLYMERS

FIELD OF THE INVENTION

The present invention relates generally to the packaging industry. More particularly, the invention relates to creating seals within plastic packages in precisely controlled regions which cannot be effectively sealed with conventional heat scaling techniques alone. These seals are made by utilizing radio frequency or high frequency (RF or HF) electromagnetic fields to heat specific regions of a package where polar polymeric materials have been strategically applied to the non-polar plastic package.

BACKGROUND OF THE INVENTION

Plastic package fabrication has traditionally been facilitated by thermally bonding portions of the plastic to create the desired design configuration. For example a flexible plastic bag has been created from a web of film by folding and heat scaling the edges together. This would be called a side seal bag. The type of sealing utilized in the bag is determined by the properties of the plastic to be sealed. Polyolefins and other non-polar plastics could only be sealed by using externally applied heat and pressure or by using adhesives. Polar plastics such as polyvinylchloride (PVC) are best sealed using RF or HF energy and externally applied pressure. The RF and HF energy rotates the polar molecules to create frictional heat which raises the material temperature to a level where it can be sealed to itself by the application of pressure.

Conventional heat/pressure sealing of plastics is controlled by the variables of seal bar temperature, dwell time and sealing pressure for a given material. HR/RF sealing of polar plastics is controlled by the frequency of the electromagnetic field, the field strength, the dwell time and the sealing pressure. By combining these two techniques on the same package it is possible to independently control the seal strengths.

Polar and non-polar polymers have not been compatible with each other in the past. However, a new class of materials produced using metallocene catalyst technology has recently been introduced to the industry. These new materials can be tailored to provide compatibility between polar and non-polar species. The compatibility permits the manufacture of packaging materials which have both polar and non-polar regions. The invention relates to the strategic positioning of these polar regions so that RF or HF sealing technology can be utilized to bond these regions together. The location of these seals can be precisely controlled as the non-polar portions of the package's material are unaffected by the RF or HF heating. Consequently, the invention is useful in manufacturing several types of packages.

A common type of package is a flexible polymeric package. Various methods have been used to provide sealing of these flexible packages to preserve the integrity of the contents therein. Often, these packages are made to be reclosable via the use of a reclosable zipper. Such zippers can be opened and closed either by pressure or by the use of an auxiliary slider mechanism. In some designs the zipper is coextruded with the film. In other designs, the zipper is a separate piece from the film that is bonded to the film.

Reclosable packages are a great convenience to the consumer especially for products such as luncheon meats and cheeses where, typically, only a portion of the product is used at any given time. A problem with these reclosable packages, however, is that the reclosable features do not provide a leak proof barrier. Thus, the contents of the package can leak out of the package and the external atmosphere can leak into the package, promoting food spoilage. Another problem with reclosable packages is that such packages can be easily tampered with prior to purchase by the consumer. To resolve this problem, several tamper evident package designs have been developed. One design incorporates a sealed membrane inside of the reclosable bag. This inner seal cannot be made by conventional, externally applied heat and pressure. Therefore a new fabrication method is required to create this type of tamper evident package.

Because the tamper evident seal and the reclosable seal are usually very close in proximity to one another, the method by which they are sealed is usually the same. Typically, this method is heat sealing. However, it is often desirable to have these two seals be of different strengths. For example, the seal placing the reclosable zipper on the package must be rugged. But, the tamper evident seal must not be so strong that the consumer struggles to open this seal or that the package tears at the seal instead of the seal opening.

Another common package which uses multiple seals is a modified-atmosphere package. Modified atmosphere packages maintain a constant gaseous atmosphere around the food generally by the use of a polymeric membrane attached to a rigid, or semi-rigid, polymeric container wherein the food is placed. A rigid, semi-rigid, or flexible lid is placed over the membrane. Thus, the membrane is sealed on its bottom side to the container and on its top side to the lid. The membrane separates two gaseous environments—one between the membrane and the container, the other between the membrane and the lid. Often, the lid is removed once the foods reaches the retail distributor to allow oxygen to permeate through the membrane into the chamber defined between the membrane and the container.

Because the membrane must remain attached to the container after the lid is removed, it more desirable to have a strong seal between the membrane and the container, and a weaker seal between the membrane and the lid. Thus, when the lid is removed by the retail distributor, the membrane will not be pulled away from the container.

SUMMARY OF THE INVENTION

The present invention is directed to a package having sealing regions which include a polar polymer that provides a seal when subjected to an alternating electromagnetic field. Consequently, several specific package designs can now be economically produced by utilizing a combination of RF/HF seals in selected polar regions of the package and conventional externally applied heat/pressure seals in non-polar regions. These designs include such things as seals of regions inside of a bag which do not affect the outer walls of the bag and the independent control of seal strengths on three or more layer seals between the various layers of the seal.

In one embodiment, a reclosable package comprises opposing wall panels and a reclosable seal. The opposing wall panels are joined on three sides so as to create a receptacle space having a mouth at one end. The reclosable seal extends along the one end and includes a first track and a second track. A polar polymer is placed on a one of the panels, preferably on a flange attached to one of the tracks.

The polar polymer, when subjected to an alternating electromagnetic field, then seals the two panels together to provide an additional seal inside the outer bag.

In another embodiment, a package includes a tray, a permeable membrane, and a lid. The tray has a base and side walls extending upwardly from the base. The side walls and the base define a cavity wherein the contents are disposed. A permeable membrane is attached to a top portion of the side walls and encloses the cavity. The lid is connected to the top portion of the side walls and is disposed above the membrane. The membrane is sandwiched between the tray and the lid. At least one side of the membrane includes a polar polymer that, when subjected to an alternating electromagnetic field, bonds the membrane to the corresponding tray or lid. In one preferred embodiment, the membrane is attached to the tray via conventional heat/pressure technique while the membrane is sealed to the lid by the use of the polar polymers and RF/HF sealing.

BRIEF DESCRIPTION OF THE DRAWINGS

Other objects and advantages of the invention will become apparent upon reading the following detailed description and upon reference to the drawings in which:

FIG. 1 is a section view of a mouth portion of a reclosable package having a tamper proof feature formed by joined flanges located below a reclosable zipper arrangement;

FIG. 2 is a perspective view of the reclosable package incorporating the mouth portion depicted in FIG. 1 in which a reclosable zipper having a slider mechanism is opened and the tamper proof feature formed by joined flanges is partially opened;

Figure 3:
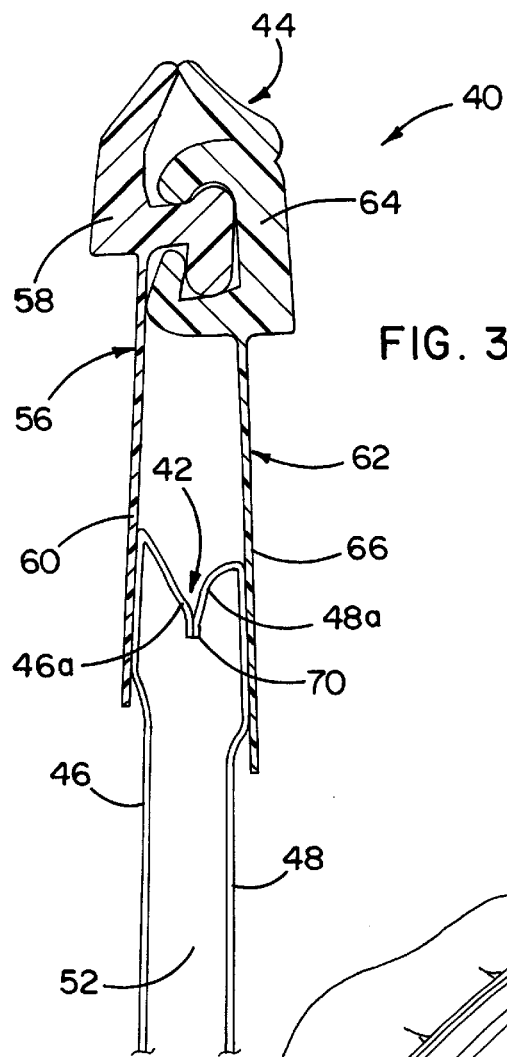
FIG. 3 is a section view of a mouth portion of an alternative reclosable package having a tamper proof feature formed by a pleated side of a package located below a reclosable zipper arrangement.

While the invention will be described in connection with certain preferred embodiments, it is not intended to limit the invention to the specific exemplary embodiments. On the contrary, it is intended to cover all alternatives, modifications, and equivalents as may be included within the spirit and scope of the invention as defined by the appended claims.

DESCRIPTION OF THE PREFERRED EMBODIMENTS

Turning now to the drawings, FIGS. 1 and 2 illustrate a reclosable package 10 which incorporates the present invention. FIG. 1 depicts a mouth portion of a reclosable package 10 having a tamper evident feature 12 located below a reclosable closure arrangement 14. The mouth portion of the reclosable package 10 includes a pair of opposing wall panels 16 and 18 of polymeric film which make up a package body 20 and define a receptacle space 22. Connected to the wall panel 16 is a first track 24 having a first profile 26 and a first flange 28 extending downward from the first profile 26. Connected to the other wall panel 18 is a second track 30 having a second profile 32 and a second flange 34 extending downward from the second profile 32. The first and second profiles 26 and 32 are releasably engageable with each other to provide the reclosable seal to the package 10.

The tracks 24 and 30 are connected to the panels 16 and 18, respectively, at points 35 and 37 in a variety of ways. Typically, the tracks 24 and 30 are connected through a process which uses heat and/or pressure.

The reclosable package 10 may also have an auxiliary slider mechanism 36 (FIG. 2) slidably mounted to the closure arrangement 14 for movement between a closed position and an open position. The first and second profiles 26 and 32 are engaged to each other while the slider mechanism 36 is in the closed position, and movement of the slider mechanism 36 from the closed position to the open position disengages the profiles 26 and 32 from each other.

The lower edges of the first and second flanges 28 and 34 are joined at a seam 38 which provides a one-time openable tamper evident feature 12. The seam 38 is immediately adjacent (i.e. within about one inch) points 35 and 37. The first and second flanges 28 and 34 that are joined at the seam 38 have a generally U-shaped or V-shaped cross-sectional configuration.

At least one of the first and second flanges 28 and 34 includes a portion that is made of a polar polymer. Typically, this portion is located at the inside surfaces lower extremities of flanges 28 and 34. Examples of such polar polymers include the Affinity® family of polar polyolefin plastics, including polar polyethylene and polar polypropylene, from Dow Plastics Corporation, of Midland, Mich. When the polar polymer is placed an alternating electromagnetic field, the polar molecules rotate which causes frictional heating (dielectric losses). As the temperature rises, the polar polymer soon reaches its melting temperature and can be bonded to the surface against which it is positioned, usually by applying external pressure. This process is also known as dielectric welding. Thus, as long as a portion of the first flange 28 or the second flange 34 includes such a polar polymer, that localized portion is heated to form seam 38 while an adjacent non-polar area remains at its normal temperature since it is not susceptible to the alternating electromagnetic field.

Different polar plastics have different susceptibilities to the alternating electromagnetic field which is usually in the radio frequency and high frequency range. Thus, different field strengths may be needed depending on the type of polar plastic. A typical frequency at which this bonding occurs is approximately 27 Mhz. The electrodes which produce this energy can be made in a variety of shapes and sizes. And, because only the polar polymeric molecules will be susceptible to such a field, excess energy outside the regions to be sealed will produce only a minimal amount of heat. Consequently, the regions where sealing is desired can be precisely controlled.

The polar plastic can be placed on the flanges 28 and 34 by various techniques. For example, a film of the polar plastic can be coextruded onto the flanges. The polar plastic may also be heated and placed on the flanges in a solid bead. By varying the amount of the polar polymer on the flange, the strength of the seal can be varied. That is to say that the applying more polar plastic will produce a larger area that is sealed and, thus, increase the bond strength. Additionally, varying the field strength and the duration of the exposure will alter the strength of the seal.

The tracks 24 and 30 are generally sealed to the panels 16 and 18 at points 35 and 37 through heat/pressure sealing techniques which produce a rugged bond. Another process which can be used at points 35 and 37 is welding which involves the introduction of an intermediate third material such as an adhesive that is utilized to "glue" dissimilar polymeric-based materials to each other. Alternatively, the tracks 24 and 30 can be coextruded onto the panels 16 and 18.

If the seam 38 were bonded by conventional heat/pressure sealing methods, then first and second flanges 28 and 34 would bond to panels 16 and 18, respectively, before the seam 38 could be formed. Thus, sealing the seam 38 by subjecting strategically located polar polymers to the alternating electromagnetic field is a more desirable method for creating a seal within the package 10. It is also more desirable because the strength of the bond at seam 38 can be controlled.

As illustrated in FIG. 2, in order to open the package 10 of the instant invention, the consumer may grip a slider mechanism 36 and move it such that the closure profiles 26 and 32 of the respective first and second tracks 24 and 30 are detached from each other. Next, the consumer tears open the tamper evident feature at seam 38 which joins the lower edges of the first and second flanges 28 and 34.

Figure 4:
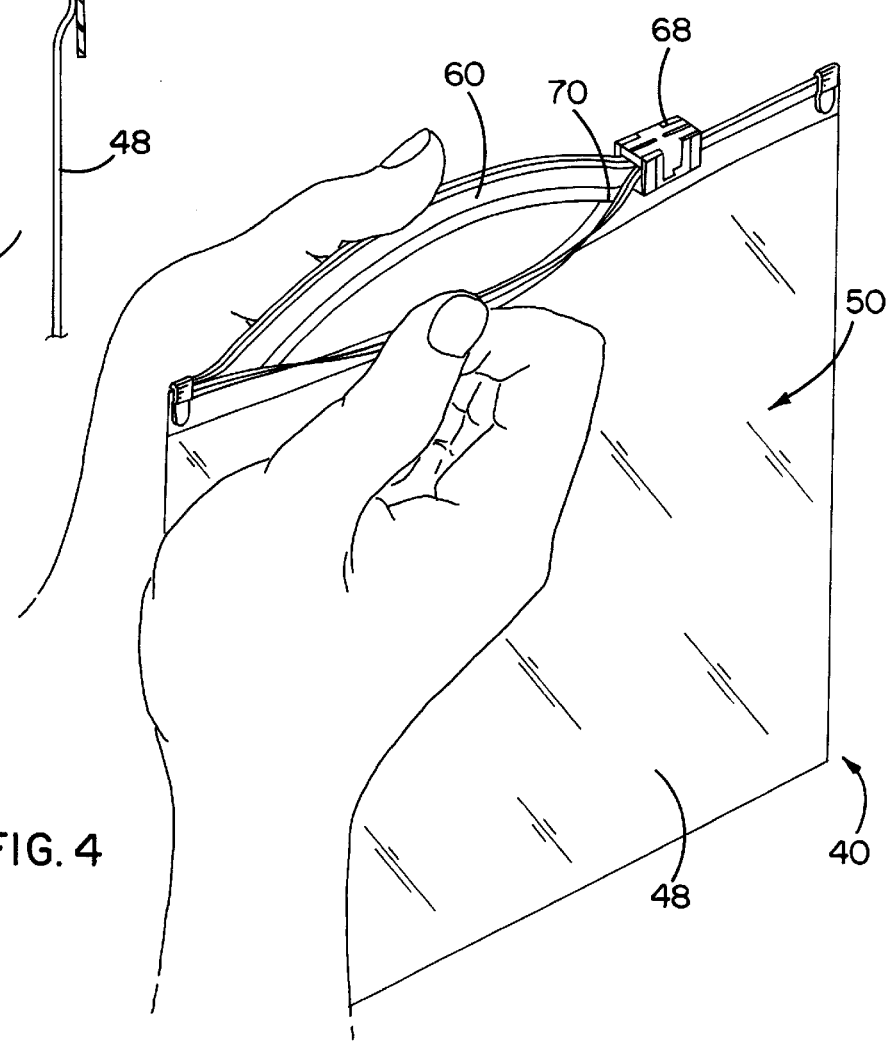
FIG. 4 is a perspective view of the reclosable package incorporating the mouth portion depicted in FIG. 3 in which a reclosable zipper having a slider mechanism is opened and the tamper proof feature formed by the pleated side is partially opened.
Figure 3A:
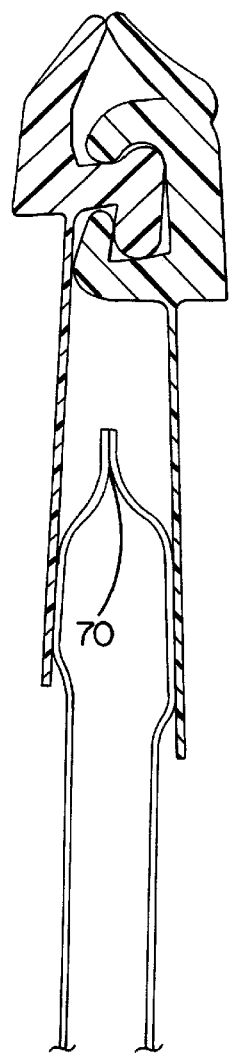
FIG. 3A is a section view of a mouth portion of an alternative reclosable package, similar to FIG. 3, having a tamper proof feature formed by a pleated side of a package located below a reclosable zipper arrangement.

FIGS. 3 and 4 show an alternative embodiment of the instant invention. FIG. 3 shows a section view of a mouth portion of a reclosable package 40 depicted in FIG. 4. The reclosable package 40 includes a tamper evident feature 42 located below a reclosable closure arrangement 44. The reclosable package 40 includes a pair of opposing wall panels 46 and 48 of polymeric film which make a package body 50 and define a receptacle space 52. The mouth end of the package 40 where the opposing wall panels 46 and 48 are sealed to each other at seam 70 includes a one-time breakable line of weakness. Although the panels 48 and 46 make an M-shaped cross-section in that they are sealed at seam 70 at points which are along their outside surfaces, these panels could also be simply sealed on their inside surfaces to form seam 70. (See FIG. 3A)

Connected to the wall panel 46 is a first track 56 having a first profile 58 and a first flange 60 extending downward from the first profile 58. Connected to the other wall panel 48 is a second track 62 having a second profile 64 and a second flange 66 extending downward from the second profile 64. The flanges 60 and 66 are typically attached to the panels 46 and 48 through conventional sealing methods. The first and second profiles 58 and 64 are releasably engageable with each other to provide a reclosable seal to the package. Again, seam 70 is immediately adjacent the points where the tracks 24 and 30 meet the panels 46 and 48.

The reclosable package 40 further has an auxiliary slider mechanism 68. As illustrated in FIG. 4, in order to open the reclosable package 40, the consumer grips the slider mechanism 68 and moves it from a closed position to an open position so as to disengage the closure profiles 58 and 64 from each other. Next, the consumer tears open the tamper evident feature along the line of weakness at seam 70. The package 40 can be resealed utilizing the reclosable closure arrangement 44 and slider mechanism 68. Specifically, the consumer grips the slider mechanism 68 and moves it from the open position to the closed position so as to engage the complementary closure profiles 58 and 64.

The ends 46a and 48a of panels 46 and 48 include segments which are made of a polar polymeric material to form the tamper-evident seal 42. Thus, by exposing these segments to an alternating electromagnetic field, the seam 70 is formed through the frictional heating produced by the rotation of the polar molecules FIGS. 1–4 depict embodiments of packages having both a tamper-evident feature as well as a reclosable closure arrangement. The tamper-evident feature not only provides a consumer with the assurance that his or her newly purchased package has never been opened before, but also provides an initial hermetic seal which preserves the freshness of the food contents of the package prior to its initial opening. Since the reclosable closure arrangement is located above the tamper evident feature, the operation of the reclosable closure arrangement is not hampered by the presence of the tamper evident feature and there is no material to remove from the package as is the case in other tamper-proof packages.

The interlocking profiles, tracks, flanges (excluding the polar polymeric parts), and optional slider mechanism are optimally made from any heat resistant blend or mixture of non-polar polyethylene, polypropylene, or copolymers of polyethylene or polypropylene. Especially preferred components are linear low density polyethylene (LLDPE) and LLDPE/polypropylene mixtures.

The opposing films making up the opposing wall panels of the polymeric packages 10 and 40 typically are made of polyethylene, polypropylene, polyester, copolyester or mixtures of those compositions. Furthermore, the polymeric packages of the present invention can have multiple layers joined by coextrusion. Thus, one skilled in the art can design and coextrude multi-layered polymeric bags which will incorporate the various properties inherent in differing polyethylene and polypropylene compositions. It is further possible to incorporate pigments and/or metallic components into or on the layer or layers of the polymeric bags of the instant invention.

Although the reclosable closure arrangements 14 and 44 have been described thus far as a zipper, an adhesive seal may be utilized as the reclosable feature of the instant invention. Such seals employ a resealable adhesive-type substance which is applied to either one or both of the films making up the polymeric package. Alternatively, the adhesive is applied to an intermediary base strip.

Figure 5:
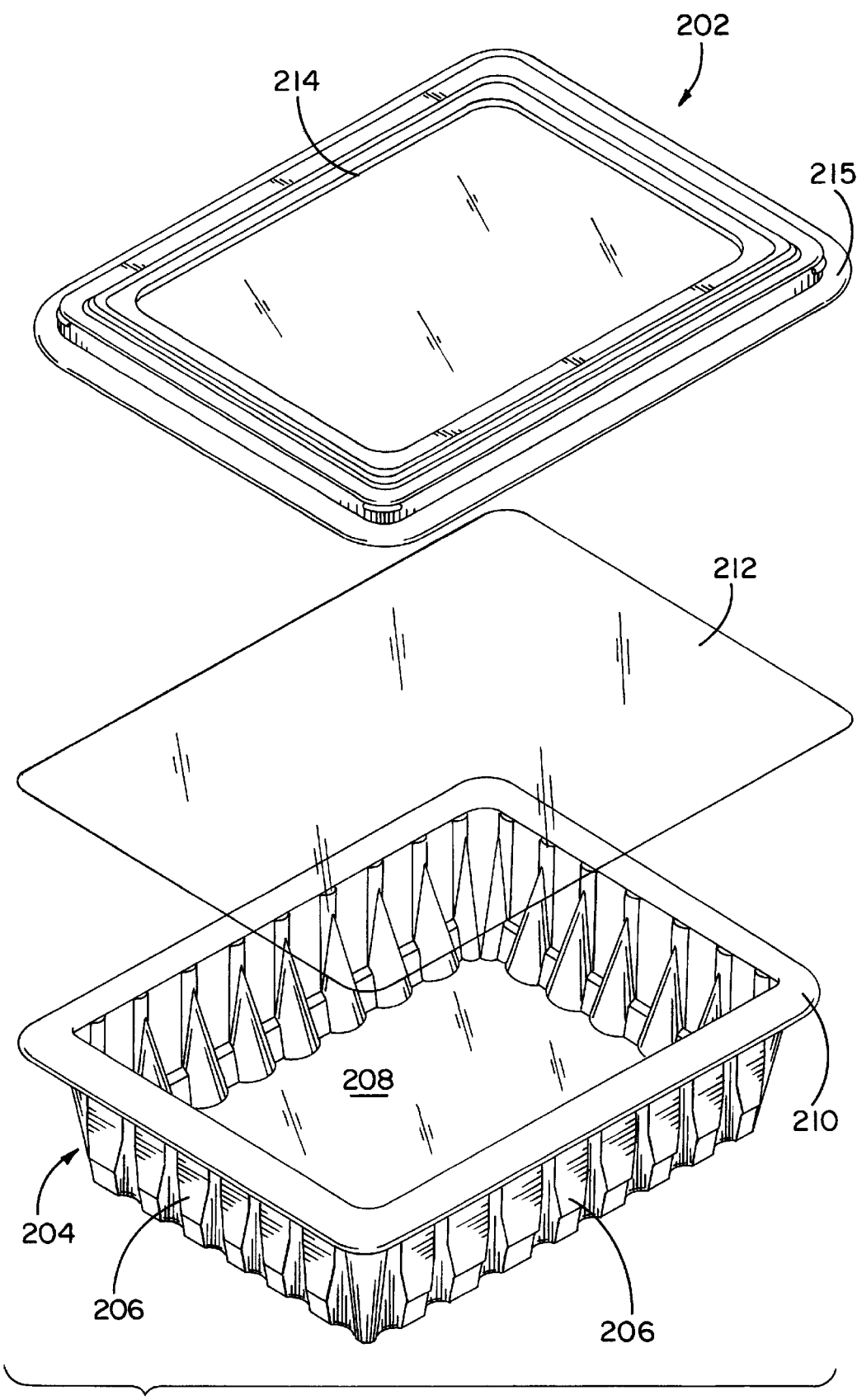
FIG. 5 is an exploded isometric view of an alternative modified-atmosphere package embodying the present invention.

Referring now to FIG. 5, an alternative modified-atmosphere package 202 is illustrated in an exploded view. The modified-atmosphere package 202 includes a tray 204 (usually rigid or semi-rigid) having side walls 206 and a base 208 from which the side walls 206 extend upwardly. Upper portions of the side walls 206 generally have an outwardly extending flange 210 which defines the periphery of the modified-atmosphere package 202.

A membrane 212 is attached along the upper portion of the side walls 206 which completely encloses the cavity defined by the side walls 206 and the base 208. The modified-atmosphere package 202 also has a lid 214 which is connected to the flange 210 of the tray 204 along a lid flange 215. When initially packaged, the lid 214 contacts the edges of the membrane 212 which are attached to the modified-atmosphere package 202 at its flange 210. In essence, the membrane 212 separates the cavity defined by the tray 204 from the cavity defined by the lid 214.

After the package 202 has been shipped to the retailer and is ready for display to consumers, the retailer may open and discard the lid 214 so that oxygen can permeate through the membrane 212. Thus, if the package 202 contains red meat, the color of the meat will become red due to the exposure to oxygen.

Figure 6:
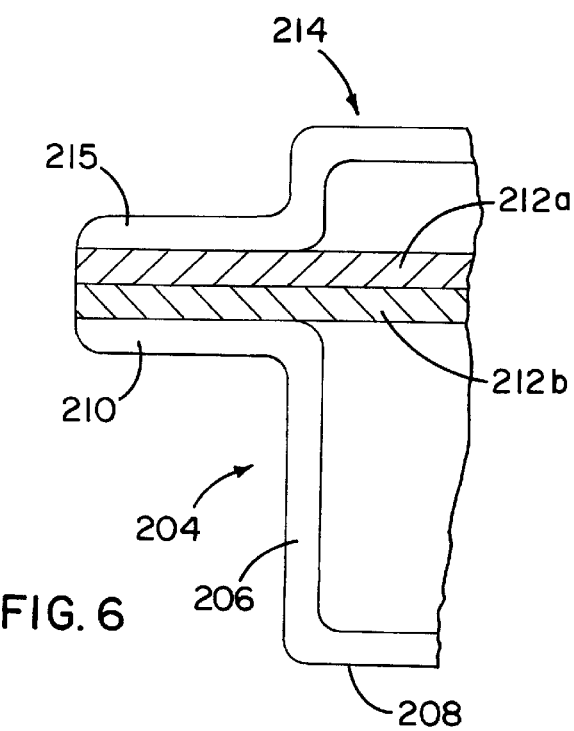
FIG. 6 is an enlarged cross-sectional view of the flange region of the package in FIG. 5.

To maintain the integrity of the immediately-adjacent seals between the membrane 212 and the flange 210 and between the membrane 212 and the lid 214, the membrane 212 generally contains a polar polymer on one side and a non-polar polymer on the other side. As shown in FIG. 6, the polar polymer 212a of the membrane is attached to the lid flange 215 on the lid 214. The non-polar polymer 212b is attached to the flange 210 of the tray by conventional heat/pressure sealing techniques. When the package 202 is exposed to an alternating electromagnetic field, the polar polymers 212a undergo rotation causing frictional heating that causes the sealing. This facilitates the lid 214 being easily removed from the membrane 212 without removing the membrane 212 from the flange 210 of the tray 204 since the seal between the membrane 212 and the lid 214 is weaker than the seal between the membrane 212 and the tray 204. The polar polymer 212a and non-polar polymer 212b can be coextruded.

Alternatively, the lid flange 215 contains this polar polymeric material instead of the membrane 212. Consequently, the seal between the membrane 212 and the tray 204 can be accomplished by conventional heat/pressure sealing methods which produce a strong bond while the seal between the membrane 212 and the lid 214 still can be subsequently formed by the use of polar polymeric materials.

By providing two types of seals (conventional and polar polymer/electromagnetic radiation), the strength of each seal can be controlled independently. For example, the conventional seal can be controlled by the sealing bar temperature, the dwell time, and the sealing pressure. Likewise, the bond formed by the polar polymers can be controlled by the field strength and duration of the electromagnetic field. If both seals were formed by conventional sealing, the independent control would not be possible.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method of manufacturing a polymeric package having multiple seals adjacent to each other, said method comprising the steps of:
   providing said package having a segment containing a polar polymer where at least one of said multiple seals is to be placed;
   sealing at least another of said multiple seals by a conventional sealing technique; and
   exposing said segment having said polar polymer to an alternating electromagnetic field.

2. The method of claim 1, wherein said step of sealing by said conventional technique includes the step of heat/pressure sealing a reclosable feature onto said package.

3. The method of claim 1, wherein said one seal brought about by said step of exposure to said alternating electromagnetic field has a different sealing strength than said another seal brought about by said conventional sealing technique.

4. The method of claim 3, wherein said another seal is a stronger seal than said one seal.

5. The method of claim 1, wherein said step of sealing by said conventional sealing technique includes the step of applying heat.

6. The method of claim 5, wherein said step of sealing by said conventional sealing technique further includes the step of applying pressure.

7. The method of claim 1, wherein said step of sealing by said conventional sealing technique includes the step of applying pressure.

8. The method of claim 1, wherein said package includes side panels which are joined at their edges except on one edge of each of said side panels thereby forming an opening to said package, said multiple seals being positioned near said opening.

9. The method of claim 1, wherein said package includes side panels, flanges, and reclosable closure devices mounted on said flanges, said side panels being joined at their edges except on one edge where an opening to said package is formed, said step of sealing by said conventional technique includes the step of sealing said flanges to said side panels.

10. The method of claim 9, wherein at least one of said flanges includes said segment containing said polar polymer, and wherein said step of exposing said segment to said alternating electromagnetic field seals said flanges to each other.

11. The method of claim 10, wherein said segment is positioned on one of flanges at an end opposing said reclosable closure device.

12. The method of claim 10, wherein said segment on said flange is between said side panels and said step of exposing said segment with alternating electromagnetic field also exposes said side panels to said alternating electromagnetic field.

13. The method of claim 9, wherein at least one of said side panels includes said segment containing said polar polymer, and wherein said step of exposing said segment to said alternating electromagnetic field seals said side panels to each other.

14. The method of claim 13, wherein said segment of said side panels is between said flanges during said step of exposing said segment to said alternating electromagnetic field.

15. The method of claim 14, wherein each of said side panels has an interior surface facing the other side panel, said segment containing said polar polymer being on said interior surface.

16. The method of claim 14, wherein each of said side panels has an interior surface facing the other side panel and an exterior surface opposed thereto, said segment containing said polar polymer being on said exterior surface and said exterior surface being folded over to engage said other side panel.

17. A method of making a polymeric package having at least two components, said at least two components being sealed to each other by first and second seals that are adjacent to each other, said first seal being located within an interior of said package, one component of said at least two components having a segment containing a polar polymer to form said first seal, said method comprising the steps of:
   providing said at least two components of said package;
   attaching said at least two components to one another at portions so as to develop said interior and an opening of said package;
   sealing two of said at least two components by a conventional seal technique at said second seal; and
   exposing said one component having said segment containing said polar polymer to an alternating electromagnetic field so as to seal said one component to another of said at least two components at said first seal.

18. The method of claim 17, wherein said at least two components includes a pair of side panels, said step of attaching said at least two components to one another includes the step of attaching a portion of the edges of said side panels to create said interior between said side panels and an opening in an area where said edges are not attached.

19. The method of claim 18, wherein said at least two components further include a flange, said step of sealing by a conventional sealing technique includes the step of sealing said flange to one of said side panels.

20. The method of claim 19, wherein said one flange includes a reclosable feature.

21. The method of claim 19, wherein said at least two components further include a second flange attached to the other of said side panels, said first flange being said component with said segment having said polar polymer, said first flange being sealed to said second flange by said first seal brought about by exposure to said alternating electromagnetic field.

22. The method of claim 21, wherein said first seal is between said side panels.

23. The method of claim 17, wherein said at least two components includes a pair of side panels and a pair of flanges, said step of attaching said at least two components to one another includes the step of attaching a portion of the edges of said side panels to create said interior between said side panels and an opening in an area where said edges are not attached, said step of sealing by a conventional sealing technique includes the step of sealing each of said flanges to one of said side panels at said corresponding second seals, said pair of side panels having said segment containing said polar polymer, said step of exposing said segment to said alternating electromagnetic field seals said side panels together at said first seal, said first seal being between said side panels.

24. The method of claim 23, wherein each of said side panels has an interior surface facing the other side panel, said segment containing said polar polymer being on said interior surface.

25. The method of claim 23, wherein each of said side panels has an interior surface facing the other side panel and an exterior surface opposed thereto, said segment containing said polar polymer being on said exterior surface and said exterior surface being folded over to engage said other side panel.

26. The method of claim 17, wherein said polar polymer is a polar polyolefin.

27. The method of claim 17, further including the step of applying pressure to said first seal.

28. The method of claim 27, wherein said steps of applying pressure and said steps of exposing said segment to an alternating electromagnetic field are accomplished simultaneously.

29. The method of claim 17, wherein said step of exposing said segment to an alternating electromagnetic field occurs after the step of sealing by said conventional seal technique.

30. The method of claim 17, further including the steps of:
   determining the magnitude of seal strength required at said first seal; and
   adjusting said alternating electromagnetic field to a field strength to result in said required seal strength.

31. The method of claim 17, further including the steps of:
   determining the magnitude of seal strength required at said first seal; and
   adjusting the duration of said alternating electromagnetic field to result in said required seal strength.

* * * * *